United States Patent
Park et al.

(10) Patent No.: US 9,774,430 B2
(45) Date of Patent: Sep. 26, 2017

(54) METHOD AND APPARATUS FOR CHANNEL ESTIMATION IN WIRELESS COMMUNICATION SYSTEM

(71) Applicant: LG ELECTRONICS INC., Seoul (KR)

(72) Inventors: Hanjun Park, Seoul (KR); Kijun Kim, Seoul (KR); Jonghyun Park, Seoul (KR); Youngtae Kim, Seoul (KR); Hyunho Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 102 days.

(21) Appl. No.: 14/718,846

(22) Filed: May 21, 2015

(65) Prior Publication Data

US 2015/0341101 A1 Nov. 26, 2015

Related U.S. Application Data

(60) Provisional application No. 62/002,166, filed on May 22, 2014.

(51) Int. Cl.
*H04L 5/00* (2006.01)
*H04B 7/04* (2017.01)

(52) U.S. Cl.
CPC .......... *H04L 5/0048* (2013.01); *H04L 5/0023* (2013.01); *H04B 7/0478* (2013.01); *H04L 5/0035* (2013.01)

(58) Field of Classification Search
None
See application file for complete search history.

(56) References Cited

U.S. PATENT DOCUMENTS

| | | | | |
|---|---|---|---|---|
| 2014/0016549 A1* | 1/2014 | Novlan | ................ | H04B 7/0417 370/328 |
| 2014/0177683 A1* | 6/2014 | Krishnamurthy | .... | H04B 7/0469 375/219 |
| 2014/0177744 A1* | 6/2014 | Krishnamurthy | .... | H04B 7/0469 375/267 |
| 2014/0177745 A1* | 6/2014 | Krishnamurthy | .... | H04B 7/0413 375/267 |

(Continued)

*Primary Examiner* — Chirag Shah
*Assistant Examiner* — Suk Jin Kang
(74) *Attorney, Agent, or Firm* — Birch, Stewart, Kolasch & Birch, LLP

(57) ABSTRACT

A method for estimating a channel transmitted through a 2-dimensional (2D) array antenna by a user equipment (UE) in a wireless communication system comprising calculating channel estimation values for each of horizontal and vertical direction antenna arrays of the 2D array antenna in a channel state information-reference signal (CSI-RS) resource using a discrete Fourier transform (DFT) based channel estimation scheme, wherein the channel estimation values are expressed as one or more non-zero channel taps due to multipath fading; deriving channel vectors for each of the horizontal direction antenna arrays and channel vectors for each of the vertical direction antenna arrays using L significant power sums of filtered channel taps; and calculating channel vectors of the 2D array antenna by operating Kronecker product of the channel vectors for each of the horizontal direction antenna arrays and the channel vectors for each of the vertical direction antenna arrays.

8 Claims, 10 Drawing Sheets

(56) References Cited

U.S. PATENT DOCUMENTS

| | | | |
|---|---|---|---|
| 2014/0301492 A1* | 10/2014 | Xin | H04B 7/0456 375/267 |
| 2015/0043673 A1* | 2/2015 | Lee | H04B 7/0469 375/267 |
| 2015/0270881 A1* | 9/2015 | Gao | H04B 7/0456 370/329 |
| 2015/0280798 A1* | 10/2015 | Gao | H04B 7/0469 375/267 |
| 2015/0288497 A1* | 10/2015 | Li | H04B 7/0413 370/329 |
| 2015/0289155 A1* | 10/2015 | Gao | H04L 5/0057 370/252 |
| 2015/0341100 A1* | 11/2015 | Kwak | H04B 7/0626 370/329 |
| 2016/0036507 A1* | 2/2016 | Wang | H04B 7/0456 375/267 |
| 2016/0050003 A1* | 2/2016 | Ko | H04B 7/0469 370/329 |
| 2016/0050006 A1* | 2/2016 | Ko | H04B 17/00 370/329 |
| 2016/0087708 A1* | 3/2016 | Kang | H04B 7/0619 370/312 |
| 2016/0204842 A1* | 7/2016 | Song | H04L 1/0029 375/267 |

\* cited by examiner

METHOD AND APPARATUS FOR CHANNEL ESTIMATION IN WIRELESS COMMUNICATION SYSTEM

This application claims the benefit of U.S. Provisional Application No. 62/002,166, filed on May 22, 2014, which is hereby incorporated by reference as if fully set forth herein.

BACKGROUND OF THE INVENTION

Field of the Invention

The present invention relates to a wireless communication system and, more particularly, to a method for channel estimation and an apparatus therefor.

Discussion of the Related Art

Recently, various devices requiring machine-to-machine (M2M) communication and high data transfer rate, such as smartphones or tablet personal computers (PCs), have appeared and come into widespread use. This has rapidly increased the quantity of data which needs to be processed in a cellular network. In order to satisfy such rapidly increasing data throughput, recently, carrier aggregation (CA) technology which efficiently uses more frequency bands, cognitive ratio technology, multiple antenna (MIMO) technology for increasing data capacity in a restricted frequency, multiple-base-station cooperative technology, etc. have been highlighted. In addition, communication environments have evolved such that the density of accessible nodes is increased in the vicinity of a user equipment (UE). Here, the node includes one or more antennas and refers to a fixed point capable of transmitting/receiving radio frequency (RF) signals to/from the user equipment (UE). A communication system including high-density nodes may provide a communication service of higher performance to the UE by cooperation between nodes.

A multi-node coordinated communication scheme in which a plurality of nodes communicates with a user equipment (UE) using the same time-frequency resources has much higher data throughput than legacy communication scheme in which each node operates as an independent base station (BS) to communicate with the UE without cooperation.

A multi-node system performs coordinated communication using a plurality of nodes, each of which operates as a base station or an access point, an antenna, an antenna group, a remote radio head (RRH), and a remote radio unit (RRU). Unlike the conventional centralized antenna system in which antennas are concentrated at a base station (BS), nodes are spaced apart from each other by a predetermined distance or more in the multi-node system. The nodes can be managed by one or more base stations or base station controllers which control operations of the nodes or schedule data transmitted/received through the nodes. Each node is connected to a base station or a base station controller which manages the node through a cable or a dedicated line.

The multi-node system can be considered as a kind of Multiple Input Multiple Output (MIMO) system since dispersed nodes can communicate with a single UE or multiple UEs by simultaneously transmitting/receiving different data streams. However, since the multi-node system transmits signals using the dispersed nodes, a transmission area covered by each antenna is reduced compared to antennas included in the conventional centralized antenna system. Accordingly, transmit power required for each antenna to transmit a signal in the multi-node system can be reduced compared to the conventional centralized antenna system using MIMO. In addition, a transmission distance between an antenna and a UE is reduced to decrease in pathloss and enable rapid data transmission in the multi-node system. This can improve transmission capacity and power efficiency of a cellular system and meet communication performance having relatively uniform quality regardless of UE locations in a cell. Further, the multi-node system reduces signal loss generated during transmission since base station(s) or base station controller(s) connected to a plurality of nodes transmit/receive data in cooperation with each other. When nodes spaced apart by over a predetermined distance perform coordinated communication with a UE, correlation and interference between antennas are reduced. Therefore, a high signal to interference-plus-noise ratio (SINR) can be obtained according to the multi-node coordinated communication scheme.

Owing to the above-mentioned advantages of the multi-node system, the multi-node system is used with or replaces the conventional centralized antenna system to become a new foundation of cellular communication in order to reduce base station cost and backhaul network maintenance cost while extending service coverage and improving channel capacity and SINR in next-generation mobile communication systems.

SUMMARY OF THE INVENTION

An object of the present invention is to provide a method for channel estimation and an apparatus therefor.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for estimating a channel transmitted through a 2-dimensional (2D) array antenna in a wireless communication system is performed by a user equipment (UE) and includes calculating channel estimation values for each of horizontal and vertical direction antenna arrays of the 2D array antenna in a channel state information-reference signal (CSI-RS) resource using a discrete Fourier transform (DFT) based channel estimation scheme, wherein the channel estimation values are expressed as one or more non-zero channel taps due to multipath fading; filtering channel taps having a delay value less than a maximum delay value from the channel estimation values for each of the horizontal and vertical direction antenna arrays; obtaining, at each reference point on time axis, a power sum of the filtered channel taps for all antenna arrays of the 2D array antenna; determining L significant power sums from among power sums obtained for all reference points; deriving channel vectors for each of the horizontal direction antenna arrays and channel vectors for each of the vertical direction antenna arrays for each channel tap corresponding to respective one of the L significant power sums using the L significant power sums; and calculating channel vectors of the 2D array antenna by operating Kronecker product of the channel vectors for each of the horizontal direction antenna arrays and the channel vectors for each of the vertical direction antenna arrays for each channel tap corresponding to respective one of the L significant power sums.

Additionally or alternatively, the method may further include receiving a CSI-RS configuration for each of the horizontal and vertical direction antenna arrays of the 2D array antenna.

Additionally or alternatively, the method may further include receiving a CSI-RS configuration for fallback to be used when the channel estimation is not available.

Additionally or alternatively, the method may further include reporting wideband CSI feedback for a fixed rank using the CSI-RS configuration for fallback when the channel estimation is not available.

Additionally or alternatively, the maximum delay value may correspond to a largest value among delay values of channels for all horizontal and vertical direction antenna arrays of the 2D array antenna.

Additionally or alternatively, the method may further include reporting a precoding matrix indicator (PMI) for each of the L significant power sums.

Additionally or alternatively, the method may further include reporting relative sizes and phase differences of the PMIs for the L significant power sums.

In another aspect of the present invention, a user equipment (UE) for estimating a channel transmitted through a 2-dimensional (2D) array antenna in a wireless communication system includes a radio frequency (RF) unit, and a processor configured to control the RF unit, wherein the processor is further configured to calculate channel estimation values for each of horizontal and vertical direction antenna arrays of the 2D array antenna in a channel state information-reference signal (CSI-RS) resource using a discrete Fourier transform (DFT) based channel estimation scheme, wherein the channel estimation values are expressed as one or more non-zero channel taps due to multipath fading, filter channel taps having a delay value less than a maximum delay value from the channel estimation values for each of the horizontal and vertical direction antenna arrays, obtain, at each reference point on time axis, a power sum of the filtered channel taps for all antenna arrays, determining L significant power sums from among power sums obtained for all reference points; derive channel vectors for each of the horizontal direction antenna arrays and channel vectors for each of the vertical direction antenna arrays for each channel tap corresponding to respective one of the L significant power sums using the L significant power sums, and calculate channel vectors of the 2D array antenna by operating Kronecker product of the channel vectors for each of the horizontal direction antenna arrays and the channel vectors for each of the vertical direction antenna arrays for each channel tap corresponding to respective one of the L significant power sums.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
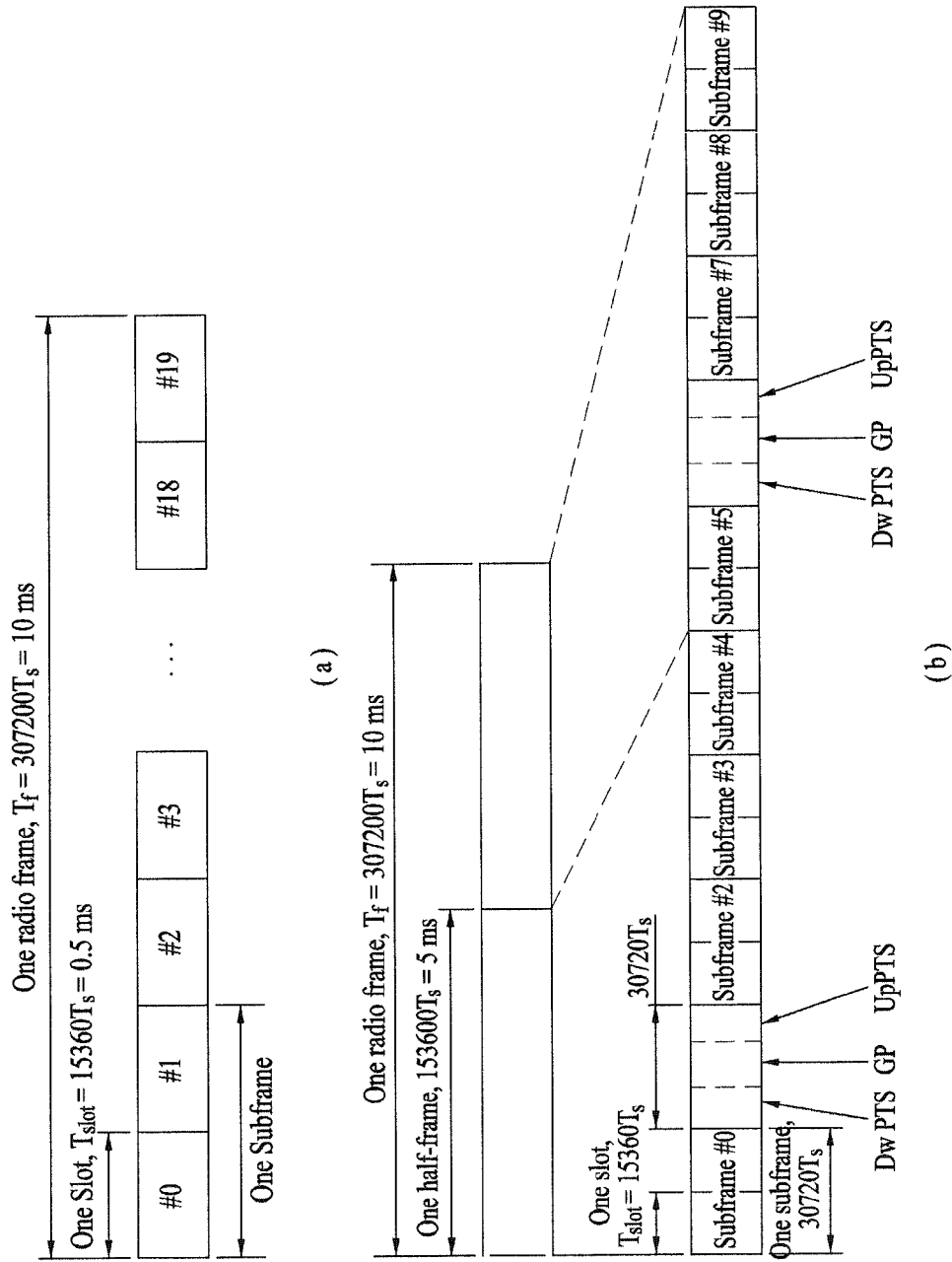
FIG. 1 illustrates an exemplary radio frame structure used in a wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlink a conventional centralized antenna system (CAS) (i.e. single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g., macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowledgement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200 Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

Figure 2:
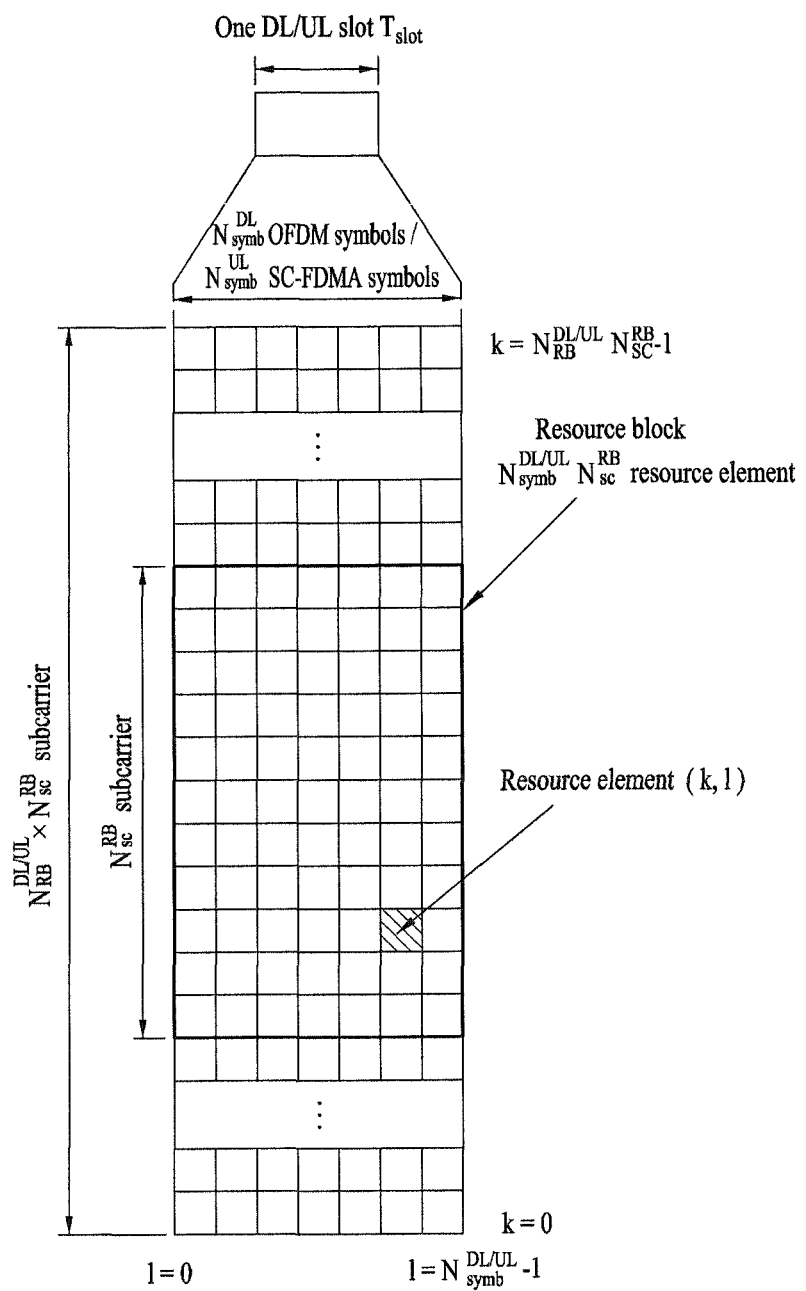
FIG. 2 illustrates exemplary downlink/uplink (DL/UL) slot structures used in a wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL}*N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL}*N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g., 7) consecutive OFDM symbols in the time domain and $N_{sc}^{RB}$ (e.g., 12) consecutive subcarriers in the frequency domain. For reference, a resource composed by an OFDM symbol and a subcarrier is called a resource element (RE) or a tone. Accordingly, an RB is composed of $N_{symb}^{DL/UL}*N_{sc}^{RB}$ REs. Each RE in a resource grid can be uniquely defined by an index pair (k, l) in a slot. Here, k is an index in the range of 0 to $N_{symb}^{DL/UL}*N_{sc}^{RB}-1$ in the frequency domain and 1 is an index in the range of 0 to $N_{symb}^{DL/UL}-1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, nPRB=nVRB is obtained. Numbers are given to the localized VRBs from 0 to $N_{VRB}^{DL}-1$, and $N_{VRB}^{DL}=N_{RB}^{DL}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
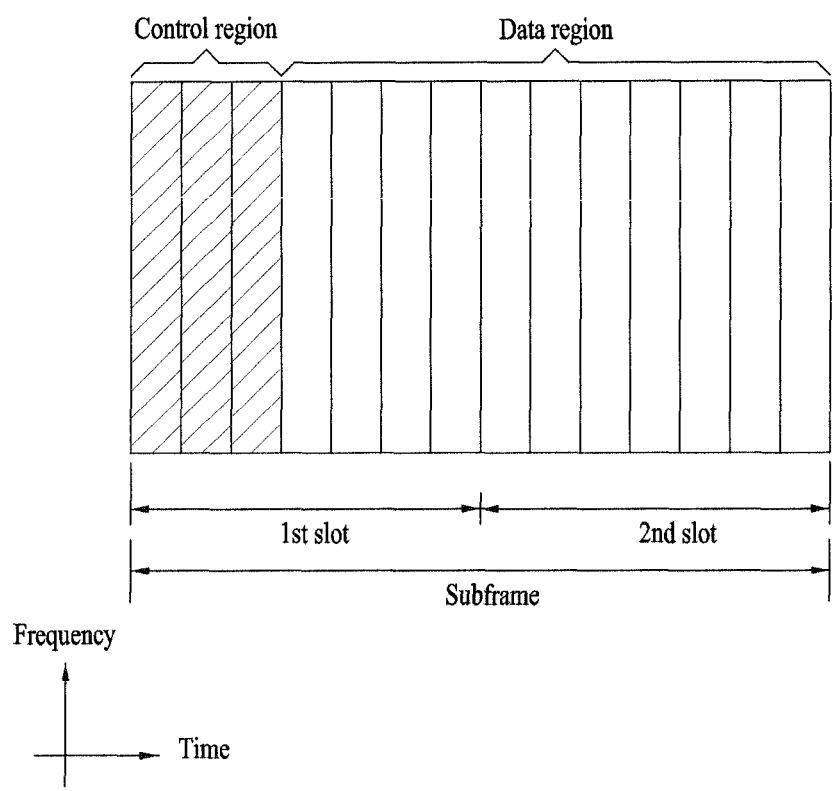
FIG. 3 illustrates an exemplary DL subframe structure used in a 3GPP LTE/LTE-A system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. Aggregation levels defining the search space is as follows.

TABLE 3

| Search Space | | | Number |
|---|---|---|---|
| Type | Aggregation Level L | Size [in CCEs] | of PDCCH candidates $M^{(L)}$ |
| UE-specific | 1 | 6 | 6 |
|  | 2 | 12 | 6 |
|  | 4 | 8 | 2 |
|  | 8 | 16 | 2 |
| Common | 4 | 16 | 4 |
|  | 8 | 16 | 2 |

A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g., frequency position) of "B" and transmission format information (e.g., transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE (-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
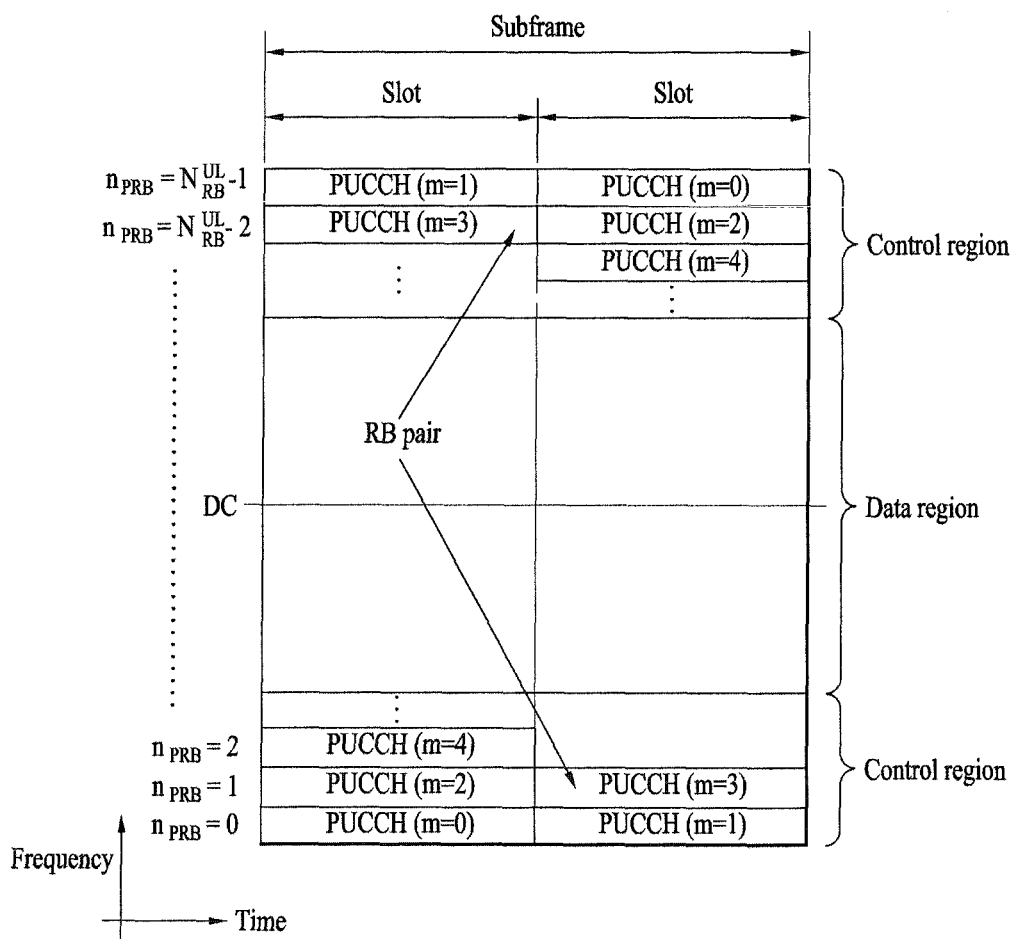
FIG. 4 illustrates an exemplary UL subframe structure used in a 3GPP LTE/LTE-A system.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (HACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon. Table 4 shows the mapping relationship between PUCCH formats and UCI in LTE/LTE-A.

TABLE 4

| PUCCH format | Modulation scheme | Number of bits per subframe, $M_{bit}$ | Usage | Etc. |
|---|---|---|---|---|
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

Employment of an active antenna system (AAS) in an advanced wireless communication system such as LTE Rel-12 is under consideration. Unlike a legacy passive antenna system in which an active circuit capable of adjusting the phase and magnitude of a signal is separate from an antenna, the AAS refers to a system in which each antenna is configured as an active antenna including an active circuit. The AAS uses the active antenna and thus does not require an additional cable, connector, other hardware, etc. for connecting an active circuit to an antenna. Accordingly, the AAS is highly efficient in terms of energy consumption and operating costs. Specifically, since each antenna supports electronic beam control, the AAS enables advanced MIMO technology, e.g., precise beam pattern forming in consideration of beam direction and beam width, or 3-dimensional (3D) beam pattern forming.

Figure 5:
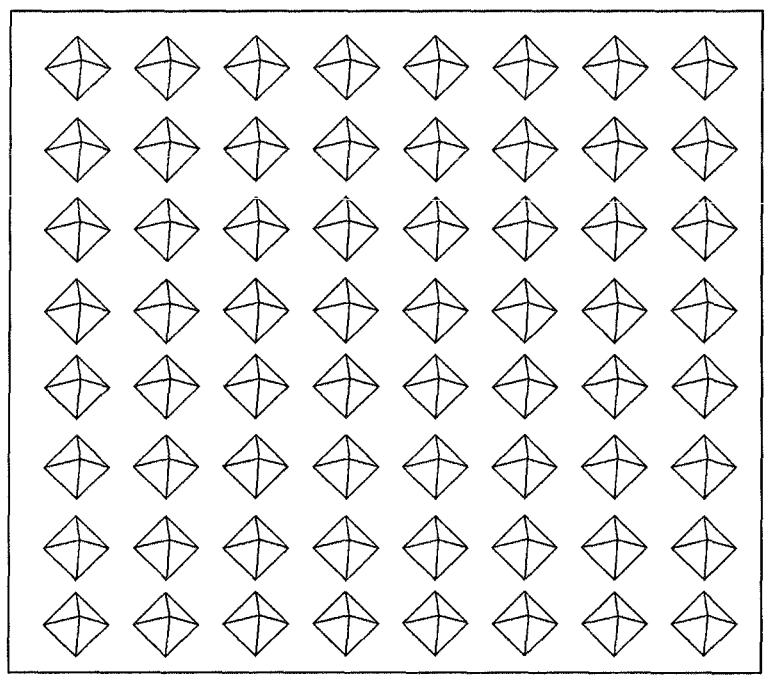
FIG. 5 illustrates the structure of a 2-dimensional (2D) antenna array.

Due to employment of an advanced antenna system such as the AAS, a massive MIMO structure having a plurality of input/output (I/O) antennas and a multidimensional antenna structure is also under consideration. For example, unlike a legacy linear antenna array, when a 2-dimensional (2D) antenna array is formed, a 3D beam pattern may be formed due to active antennas of the AAS. In view of a base station (BS), when the 3D beam pattern is utilized, forming of sectors in the vertical direction as well as the horizontal direction of beams can be considered. FIG. 5 illustrates a massive MIMO structure of 64 antenna ports in 8 rows in the horizontal direction and 8 columns in the vertical direction.

A wireless communication system such as LTE receives channel state information (CSI) feedback from a user equipment (UE) to determine a data transmission scheme such as scheduling, precoding or modulation and coding scheme (MCS). For example, in LTE Rel-11, when data based on transmission mode (TM) 10 is served, a serving cell allocates a CSI-reference signal (RS) for data channel measurement and a CSI-interference measurement (IM) resource for interference measurement to UEs served by the serving cell for the CSI feedback. In this case, a combination of a single CSI-RS and a single CSI-IM resource is defined as a CSI process. The UE having received allocation of the CSI process measures spatial characteristics and reception power of a received signal based on the CSI-RS, measures spatial characteristics and interference power of an interference signal based on the CSI-IM resource, determines a rank indicator (RI), a precoding matrix indicator (PMI), and a channel quality indicator (CQI) of the corresponding CSI process, and reports the determined information to the serving cell. In LTE Rel-11, the UE may receive allocation of a plurality of CSI processes to receive data transmitted from a plurality of cells according to a coordinated multiple point transmission/reception (CoMP) scheme. In this case, the UE feeds back the CSI acquired in each CSI process to the BS according to an independent period and subframe offset.

Figure 6:
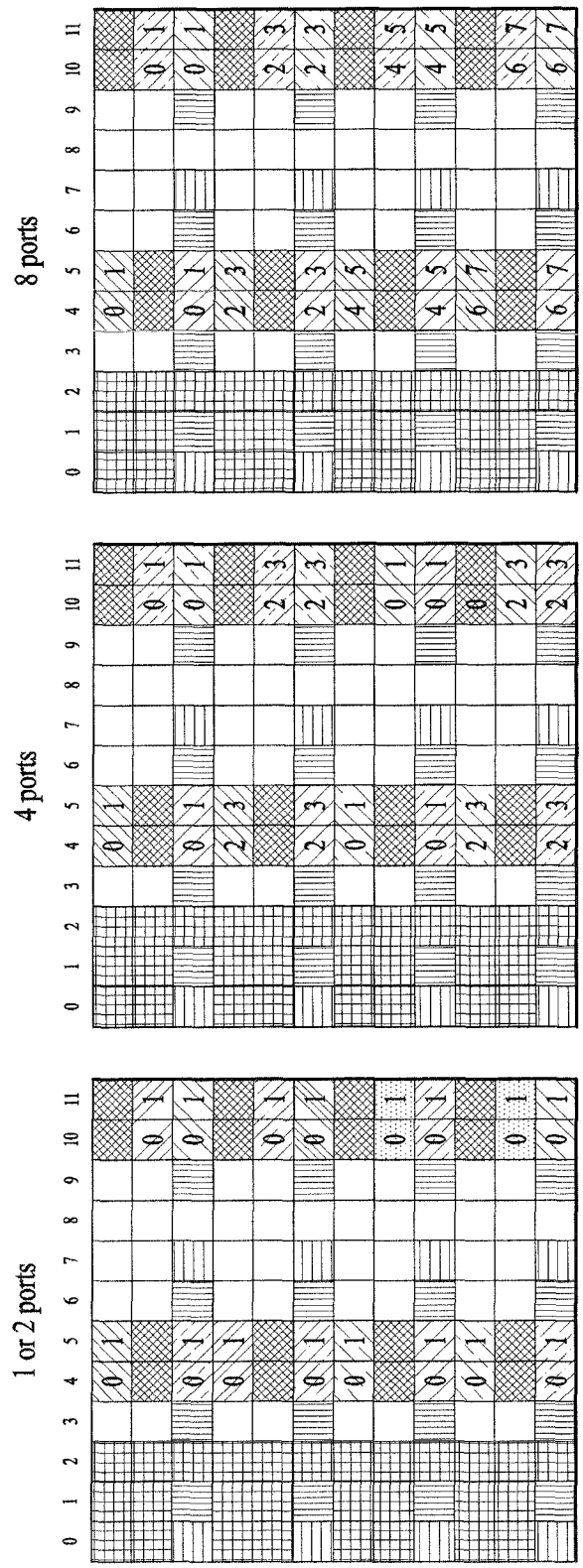
FIG. 6 illustrates allocation of channel state information-reference signal (CSI-RS) resources.

In the LTE Rel-11 system, the CSI-RS can support 1, 2, 4, and 8 antenna ports, and resource elements (REs) used as CSI-RS resources are as illustrated in FIG. 6.

In this case, if the massive MIMO structure of FIG. 5 is employed, the CSI-RS should be able to support up to 64 antenna ports, and thus the number of necessary CSI-RS resources is increased in proportion to the number of antenna ports. Accordingly, if CSI-RS resources for a total of 64 antenna ports are allocated, CSI-RS overhead can be excessively increased and overall system efficiency can be reduced. To solve the above problem, a method for expressing $(1 \times M_H M_V)$ channel vectors according to a 2D antenna port array having $M_H$ rows in the horizontal direction and $M_V$ columns in the vertical direction, as a Kronecker product of $(1 \times M_H)$ channel vectors for a specific horizontal direction 1D antenna port array and $(1 \times M_V)$ channel vectors for a specific vertical direction 1D antenna port array is under consideration. Here, the legitimacy of expressing channels for the 2D antenna port array as the Kronecker product can be found in an environment (e.g., line of sight (LOS)) where a channel is formed only in a single path.

Figure 7:
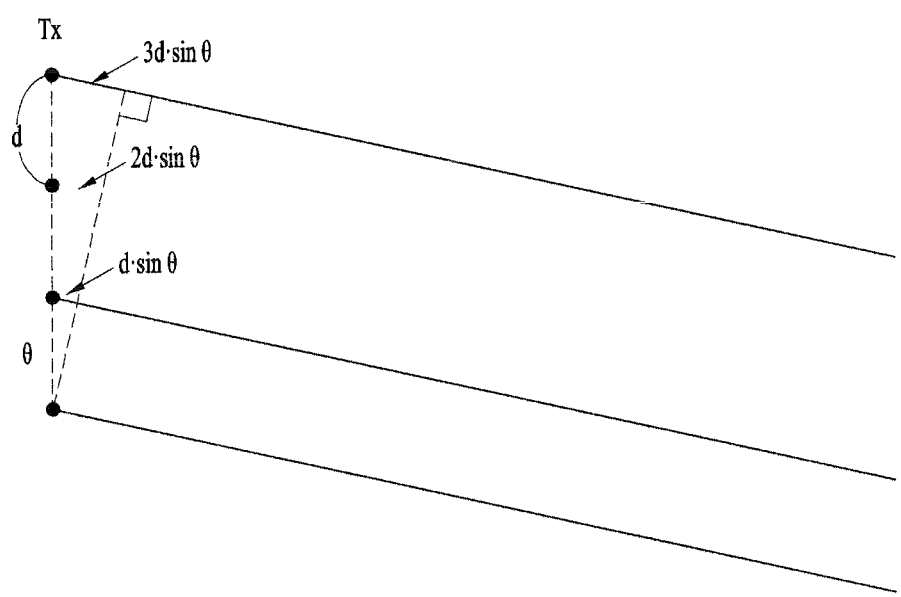
FIG. 7 illustrates a path from each antenna port.

When the distances between antenna ports in the horizontal and vertical directions are equal as illustrated in FIG. 7 and a transmitter and a receiver are sufficiently far away from each other, radio waves are expressed as plane waves and a channel for each antenna port has a time delay corresponding to a multiple of a certain time unit due to a path difference from a reference antenna port. The time delay is expressed as a linear phase increment proportional to the value of $d \cdot \sin(\theta)/\lambda$ (where $\lambda$ is wavelength) in terms of the wave. Since the distance d between antenna ports is generally expressed as $c \cdot \lambda$ (where c is a constant), a channel per antenna port has a fixed phase difference, and the phase difference may be reflected as a complex value having a size of 1 and a phase value in a process for expressing a wave as the complex value. For example, in an LOS environment, $(1 \times M_H M_V)$ channel vectors for an $(M_H \times M_V)$ antenna array may be expressed as given by the following equation.

$$h_{LOS} = \alpha \cdot [1 \; e^{j\Delta_V} \; e^{j2\Delta_V} \ldots e^{j(M_V-1)\Delta_V} \; e^{j\Delta_H} \; e^{j(\Delta_H+\Delta_V)} \; e^{j(\Delta_H+2\Delta_V)} \ldots e^{j(\Delta_H+(M_V-1)\Delta_V)} \ldots e^{j(M_H-1)\Delta_H} \; e^{j((M_H-1)\Delta_H+\Delta_V)} \; e^{j((M_H-1)\Delta_H+2\Delta_V)} \ldots e^{j((M_H-1)\Delta_H+(M_V-1)\Delta_V)}]$$

[Equation 1]

Here, $\alpha$ is a complex value and denotes an LOS channel gain, and $\Delta_H$ and $\Delta_V$ denote phase increments of horizontal direction and vertical direction antenna ports, respectively. In this case, $h_{LOS}$ may be expressed in the form of a Kronecker product as given by the following equation.

$$h_{LOS} = (\alpha)^{-1} \cdot h_H \otimes h_V$$

$$h_H = \alpha \cdot [1 \; e^{j\Delta_H} \; e^{j2\Delta_H} \ldots e^{j(M_H-1)\Delta_H}]$$

$$h_V = \alpha \cdot [1 \; e^{j\Delta_V} \; e^{j2\Delta_V} \ldots e^{j(M_V-1)\Delta_V}]$$

[Equation 2]

Here, $h_H$ and $h_V$ denote horizontal direction $(1 \times M_H)$ channel vectors and vertical direction $(1 \times M_V)$ channel vectors, respectively. However, an actual radio channel has multipath fading through which a transmitted radio wave is reflected by a plurality of clusters, causing different time delays. For example, when one OFDM symbol has N FFT sizes, a channel for an n-th sample time and a p-th Tx antenna port may be expressed as a discrete time impulse response given by the following equation.

$$h_p[n] = \sum_{l=0}^{L_p-1} \alpha_{l,p} \cdot \delta(n - \tau_{l,p}) \text{ for}$$

$$n = 0, 1, \ldots, N-1,$$

$$p = 0, 1, \ldots, M_H M_V - 1$$

[Equation 3]

Here, $\alpha_{l,p}$ is a complex value and denotes a channel gain for an l-th path and the p-th Tx antenna port, $\tau_{l,p}$ denotes a time delay for an l-th path and the p-th Tx antenna port and is expressed on an OFDM sample time basis, $\delta(n-\tau_{l,p})$ denotes a delta function in the discrete time domain, and $L_p$ denotes a total number of paths of a channel for the p-th Tx antenna port. In this case, in the multipath fading environment, expression in the form of a Kronecker product as given by Equation 1 and Equation 2 may not be easily ensured due to multiple paths of a channel.

Figure 8:
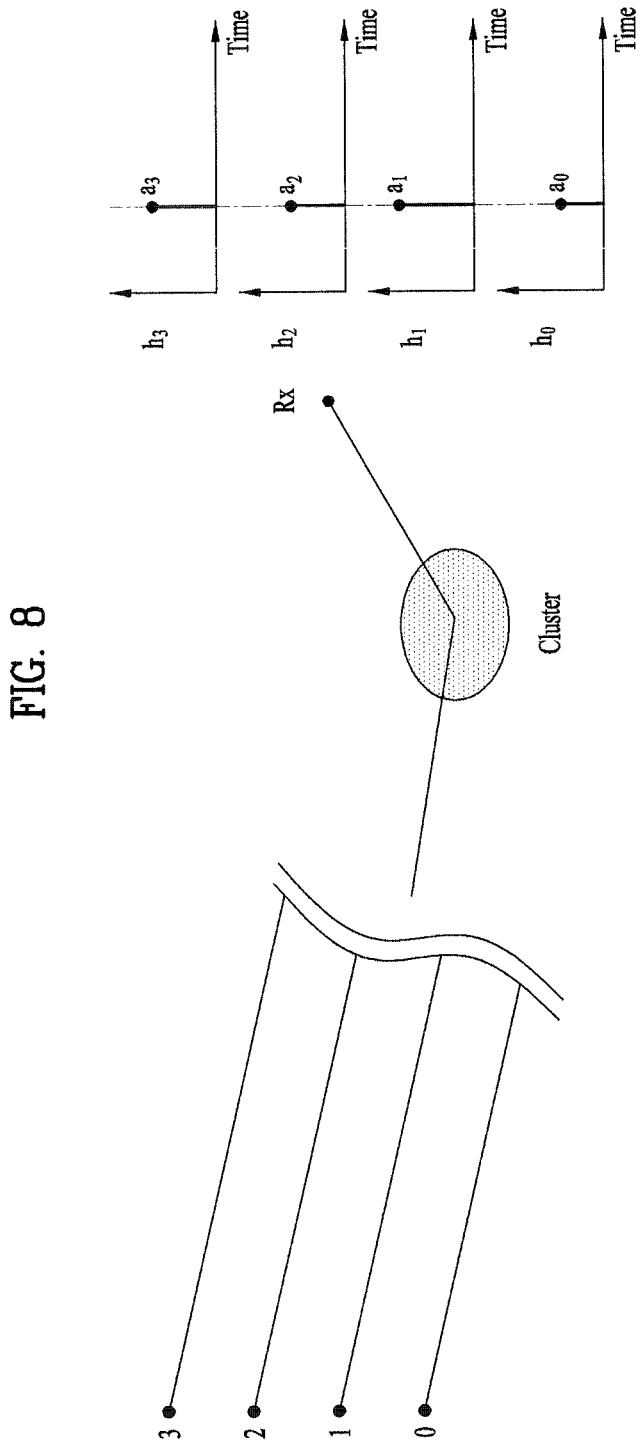
FIG. 8 illustrates a path of each antenna port from a transmitter to a receiver.

However, when a spatial channel model (SCM) or the like is considered in a 3GPP LTE system (e.g., TR25.996), it is generally considered that a main path of a channel is generated by a specific cluster. Accordingly, Equation 3 can assume that $\tau_{l,p}$ and $L_p$ are equal for all Tx antenna port channels. FIG. 8 illustrates an example thereof.

In this case, assuming that a channel gain generated by the l-th path is equally applied to antenna ports, $(1 \times M_H M_V)$ channel vectors $h_l$ in the l-th path may be expressed as given by the following equation.

$$h_l = [\alpha_{l,0} \; \alpha_{l,1} \; \cdots \; \alpha_{l,M_H M_V - 2} \; \alpha_{l,M_H M_V - 1}]$$

$$\cong \alpha_{l,0} \cdot [1 \; e^{j\Delta_V} \; e^{j2\Delta_V} \ldots$$

$$e^{j(M_V-1)\Delta_V} \; e^{j\Delta_H} \; e^{j(\Delta_H+\Delta_V)} \; e^{j(\Delta_H+2\Delta_V)} \ldots$$

$$e^{j(\Delta_H+(M_V-1)\Delta_V)} \ldots$$

$$e^{j(M_H-1)\Delta_H} \; e^{j((M_H-1)\Delta_H+\Delta_V)} \; e^{j((M_H-1)\Delta_H+2\Delta_V)} \ldots$$

$$e^{j((M_H-1)\Delta_H+(M_V-1)\Delta_V)}]$$

[Equation 4]

That is, even in a channel which has experienced multipath fading, the method for expressing the $(1 \times M_H M_V)$ channel vectors according to the 2D antenna port array as a Kronecker product of the ($1 \times M_H$) channel vectors for a specific horizontal direction 1D antenna port array and the ($1 \times M_V$) channel vectors for a specific vertical direction 1D antenna port array can be effective for each channel tap.

Accordingly, the present invention proposes a channel estimation method using a Kronecker product property when a channel has a discrete time impulse response having one or more non-zero taps due to multipath fading in an OFDM based wireless communication system having a 2D massive MIMO structure.

Specifically, a horizontal direction 1D antenna port array having $M_H$ antenna ports and a vertical direction 1D antenna port array having $M_V$ antenna ports are defined, and DFT based channel estimation is performed per antenna port in consideration of L channel taps. Then, ($1 \times M_H$) channel vectors $\hat{h}_{H,l}$ and ($1 \times M_V$) channel vectors $\hat{h}_{V,l}$ corresponding to channel estimation values in an l-th channel tap per 1D antenna port array are defined, and a Kronecker product of the $\hat{h}_{H,l}$ and $\hat{h}_{V,l}$ values is obtained to calculate ($1 \times M_H M_V$) channel vectors $\hat{h}_l$ per channel tap. Although the following description is focused on an LTE system for convenience of explanation, operation of the present invention is applicable to an arbitrary wireless communication system using a massive MIMO structure and a CSI feedback structure.

CSI process including multiple CSI-RSs

In operation according to an embodiment of the present invention, to estimate channel vectors for a 2D antenna port array using channel vectors for 2 1D antenna port arrays, CSI-RSs for the 1D antenna port arrays should be initially defined. Accordingly, the CSI Process supporting the operation according to the current embodiment should include a CSI-RS for a horizontal direction 1D antenna port array and a CSI-RS for a vertical direction 1D antenna port array, and also include information about a CSI-RS for fallback operation to be prepared for a case in which a Kronecker product is not applicable. In the following description of the present invention, for convenience of explanation, the above CSI-RSs are denoted by CSI-RS$_H$, CSI-RS$_V$, and CSI-RS$_F$, respectively. In this case, a beam fixed in the vertical direction may be used as an example of CSI-RS$_F$ for fallback operation, and thus a CSI-RS for determining only a horizontal beam direction as in a pre-Rel-12 LTE system may be considered. Furthermore, information indicating whether each CSI-RS resource is for the horizontal direction 1D antenna port array, the vertical direction 1D antenna port array, or the fallback operation should be added to configuration information corresponding to the CSI-RS resource.

Information about common antenna port

Figure 9:
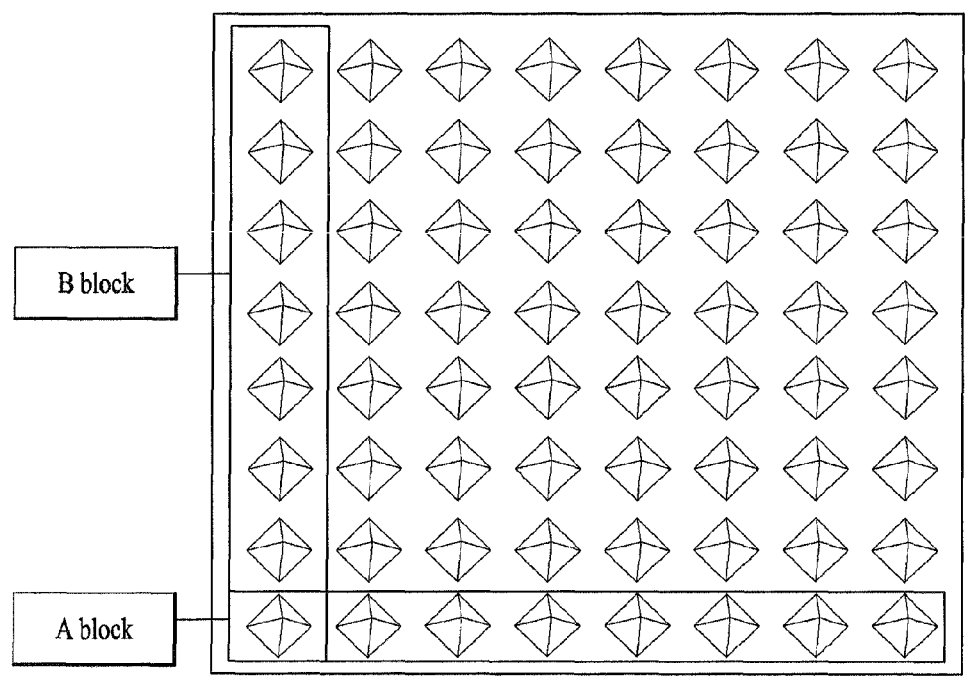
FIG. 9 illustrates the structure of a 2D antenna array.

A specific embodiment of the present invention proposes a method for signaling information about a common antenna port between a CSI-RS for a horizontal direction 1D antenna port array and a CSI-RS for a vertical direction 1D antenna port array when the two CSI-RSs are signaled using different CSI-RS configurations as in the above CSI process configuration. For example, for an 8×8 2D antenna port array, an 8-port CSI-RS for the horizontal direction 1D antenna port array and an 8-port CSI-RS for the vertical direction 1D antenna port array may be included in a CSI process. In this case, it is assumed that the horizontal direction 1D antenna port array and the vertical direction 1D antenna port array are defined as block A and block B of FIG. 9, respectively.

In this case, blocks A and B share a common antenna port. If the UE can acquire information about the shared antenna port, the UE may perform channel estimation using both of a CSI-RS resource allocated to the corresponding antenna port among CSI-RS$_H$ resources and a CSI-RS resource allocated to the corresponding antenna port among CSI-RS$_V$ resources. In addition, when the CSI-RS$_H$ and CSI-RS$_V$ signals are transmitted at different timings and thus a phase shift can be caused by a time delay, the phase shift between the CSI-RS$_H$ based channel estimation values and the CSI-RS$_V$ based channel estimation values may be corrected using a phase variation in a channel for the common antenna port.

Channel estimation process for horizontal/vertical direction 1D antenna Port Array Estimation of least square (LS) of channel frequency response (CFR)

Initially, a discrete time domain reception signal of an OFDM symbol having a DFT size of N may be expressed as given by the following equation.

$$y[n] = h[n] * x[n] + w[n] \forall n \in \{0, 1, \ldots, N-1\} \quad \text{[Equation 5]}$$

Here, * denotes cyclic convolution. In this case, the signal may be expressed as given by the following equation due to DFT transformation.

$$Y[k] = H[k]X[k] + W[k] \quad \forall k \in \{0, 1, \cdots, N-1\} \quad \text{[Equation 6]}$$

$$Y[k] = DFT\{y[n]\} = \frac{1}{\sqrt{N}} \sum_{n=0}^{N-1} y[n] e^{-j2\pi kn/N}$$

$$H[k] = \frac{1}{\sqrt{N}} \sum_{n=0}^{N-1} h[n] e^{-j2\pi kn/N}$$

$$X[k] = \frac{1}{\sqrt{N}} \sum_{n=0}^{N-1} x[n] e^{-j2\pi kn/N}$$

$$W[k] = \frac{1}{\sqrt{N}} \sum_{n=0}^{N-1} w[n] e^{-j2\pi kn/N}$$

Then, it is assumed that an RS such as CSI-RS is transmitted at the following location.

$$\Omega = \{0, \Delta_f, 2\Delta_f, \ldots, (M_{RS}-1)\Delta_f\} \quad \text{[Equation 7]}$$

Here, $\Delta_f$ denotes a frequency axis distance between RSs, and $M_{RS}$ denotes a total number of RSs on the frequency axis. In this case, LS estimation values of channels on the frequency axis may be expressed as given by the following equation.

$$\tilde{G}[k] = \begin{cases} Y[\Delta_f k]/X[\Delta_f k] & \forall (\Delta_f k) \in (\Omega \cap \Omega_{VC}^c) \\ 0 & \forall (\Delta_f k) \in (\Omega \cap \Omega_{VC}) \end{cases} \quad \text{[Equation 8]}$$

Here, $\Omega_{VC}$ denotes the location of a vertical subcarrier in which an RS is not actually transmitted due to implementation, among $\Omega$ locations.

Estimation of channel impulse response (CIR)

Then, if the LS estimation values on the frequency axis are IDFT-transformed to a time axis, channel impulse response (CIR) estimation values are obtained as given by the following equation.

$$\tilde{g}[n] = \frac{1}{\sqrt{M_{RS}}} \sum_{k=0}^{M_{RS}-1} \tilde{G} e^{j2\pi kn/M_{RS}}, \quad \text{[Equation 9]}$$

$$\forall n \in \{0, 1, \cdots, M_{RS} - 1\}$$

A channel estimation value for a (p=1, 2, ..., $M_H$)-th antenna port for the horizontal direction 1D antenna port array and a (q=1, 2, ..., $M_V$)-th antenna port for the vertical direction 1D antenna port array may be expressed as given by the following equation using the above DFT based channel estimation method.

$$\tilde{g}_{H,p}[n] = \frac{1}{\sqrt{M_{RS}}} \sum_{k=0}^{M_{RS}-1} \tilde{G}_{H,p}[k] e^{j2\pi kn/M_{RS}}, \quad \text{[Equation 10]}$$

$$\forall n \in \{0, 1, \cdots, M_{RS} - 1\}, p \in \{1, 2, \cdots, M_H\}$$

$$\tilde{g}_{V,q}[n] = \frac{1}{\sqrt{M_{RS}}} \sum_{k=0}^{M_{RS}-1} \tilde{G}_{V,q}[k] e^{j2\pi kn/M_{RS}},$$

$$\forall n \in \{0, 1, \cdots, M_{RS} - 1\}, q \in \{1, 2, \cdots, M_V\}$$

The estimated CIR values may be filtered using information about channel taps on the time axis, and resultant values thereof may be DFT-transformed to update the frequency axis channel estimation values in subcarriers belonging to $\Omega \cap \Omega_{VC}$, thereby increasing an accuracy level thereof. In this regard, the present invention proposes below a method for selecting L channel taps for time axis filtering, which are commonly applied to the ($M_H+M_V$) antenna port channels.

Method for selecting L channel taps

Configuration of Non-Zero Taps Based on Maximum Delay

When a maximum delay among delay values for a total of ($M_H+M_V$) antenna port channels for the horizontal direction 1D antenna port array and the vertical direction 1D antenna port array is denoted by $\tau_{max}$, a specific embodiment of the present invention proposes a method for setting values after the maximum delay among the CIR values estimated for the ($M_H+M_V$) antenna port channels in the above CIR estimation process, to 0. In detail, when a sample time within an OFDM symbol is denoted by $T_s$, a timing corresponding to the maximum delay may be calculated as given by Q=min ($\lceil \tau_{max}/T_s \rceil$, $M_{RS}$). Then, values of an n(≥Q) timing among the CIR values estimated in the above CIR estimation process are regarded as noise and set to 0. The following equation shows a process thereof.

$$\hat{g}_{H,p}[n] = \begin{cases} \tilde{g}_{H,p}[n] & \forall n \in \{0, 1, \cdots, Q\} \\ 0 & \forall n \in \{Q+1, \cdots, M_{RS}-1\} \end{cases} \quad \text{[Equation 11]}$$

$$\hat{g}_{V,q}[n] = \begin{cases} \tilde{g}_{V,q}[n] & \forall n \in \{0, 1, \cdots, Q\} \\ 0 & \forall n \in \{Q+1, \cdots, M_{RS}-1\} \end{cases}$$

Equation 11 can be interpreted that time axis filtering is performed by reflecting that a timing at which non-zero taps of CIR are generated is within the maximum delay value of the channel. However, the present invention is designed to find channel taps aligned for all antenna ports, and thus is characterized in that the value of Q is not determined according to a delay of each antenna port channel but is determined by selecting a maximum delay value among delays of a total of ($M_H+M_V$) antenna port channels.

Configuration of L Significant Channel Taps Based on Channel Power Sum

A specific embodiment of the present invention proposes a method for performing time axis filtering by selecting L significant channel taps commonly applied to a total of ($M_H+M_V$) antenna port channels in the order of size based on a power sum at an n-th timing (≤Q) of the CIR estimated for the total of ($M_H+M_V$) antenna port channels in the above CIR estimation process, and defining locations of the L channel taps as a set $\Psi_L$. Although the number of non-zero taps of the CIR estimated using channel delay information is limited to within Q in the above CIR estimation process, non-zero taps generated due to noise may still be mixed with meaningful channel taps corresponding to actual paths. Accordingly, an embodiment of the present invention proposes a method for selecting L channel taps in the order of size based on a power sum S[n] at an n-th timing (≤Q) of the CIR estimated for a total of ($M_H+M_V$) antenna port channels expressed as given by the following equation.

$$S[n] = \sum_{p=1}^{M_H} |\hat{g}_{H,p}[n]|^2 + \sum_{q=1}^{M_V} |\hat{g}_{V,q}[n]|^2 \quad \text{[Equation 12]}$$

In this case, the locations of the L channel taps may be defined as a set $\Psi_L$. For example, the L channel taps may be sequentially selected by defining $0 \in \Psi_L$ if S[n] has the largest value at n=0, and then finding a timing at which S[n] has the second largest value. In this manner, additional time axis filtering may be performed on the L channel taps of the CIR, which have been filtered once in the above CIR estimation process, as given by the following equation.

$$\hat{g}'_{H,p}[n] = \begin{cases} \hat{g}_{H,p}[n] & \forall n \in \Psi_L \\ 0 & \forall n \notin \Psi_L \end{cases} \quad \text{[Equation 13]}$$

$$\hat{g}'_{V,q}[n] = \begin{cases} \hat{g}_{V,q}[n] & \forall n \in \Psi_L \\ 0 & \forall n \notin \Psi_L \end{cases}$$

Process for updating CFR estimation values

A specific embodiment of the present invention proposes a process for updating estimation values of CFR for sub-carriers belonging to $\Omega \cap \Omega_{VC}$ other than $\Omega \cap \Omega_{VC}^c$ corresponding to the location of the RS, by DFT-transforming the estimation values of CIR on which time axis filtering is performed using L channel taps in the above-described process. The above operation may be expressed as given by the following equation.

$$\hat{G}[k] = \frac{1}{\sqrt{M_{RS}}} \sum_{n=0}^{M_{RS}-1} \hat{g}'[n] e^{-j2\pi kn/M_{RS}}, \quad \text{[Equation 14]}$$

$$\forall k \in \{0, 1, \cdots, M_{RS} - 1\}$$

$$\tilde{G}[k] = \begin{cases} Y[\Delta_f k]/X[\Delta_f k] & \forall (\Delta_f k) \in (\Omega \cap \Omega_{VC}^c) \\ \hat{G}[k] & \forall (\Delta_f k) \in (\Omega \cap \Omega_{VC}) \end{cases}$$

The above process is equally applicable to $\tilde{G}_{H,p}[k]$ and $\tilde{G}_{V,q}[k]$. The above-described CIR estimation process, the L channel tap selection process, and the CFR estimation value updating process may be repeated thereafter to achieve $\hat{g}'_{H,p}[n]$ and $\hat{g}'_{V,q}[n]$ having high channel estimation accuracy, and these values may be transformed into CIR for N-point DFT as given by the following equation.

$$\hat{h}_{H,p}[n] = \quad \text{[Equation 15]}$$

$$\begin{cases} \hat{g}'_{H,p}[n] & 0 \le n < M_{RS}/2 - 1 \\ 0 & M_{RS}/2 - 1 \le n < N - M_{RS}/2 - 1 \\ \hat{g}'_{H,p}[n - N + M_{RS}] & N - M_{RS}/2 - 1 \le n < N - 1 \end{cases}$$

-continued $$\hat{h}_{V,q}[n] = \begin{cases} \hat{g}'_{V,q}[n] & 0 \le n < M_{RS}/2 - 1 \\ 0 & M_{RS}/2 - 1 \le n < N - M_{RS}/2 - 1 \\ \hat{g}'_{V,q}[n-N+M_{RS}] & N - M_{RS}/2 - 1 \le n < N - 1 \end{cases}$$

Channel estimation of 2D antenna port array

Estimation according to Kronecker product operation per channel tap

A specific embodiment of the present invention proposes a method for defining ($1 \times M_H$) channel vectors $\hat{h}_{H,l}$ and ($1 \times M_V$) channel vectors $\hat{h}_{V,l}$ corresponding to channel estimation values in an l-th channel tap for each 1D antenna port array, and obtaining a Kronecker product of the $\hat{h}_{H,l}$ and $\hat{h}_{V,l}$ values to calculate ($1 \times M_H M_V$) channel vectors $\hat{h}_l$ per channel tap, when CIR has been estimated for the horizontal direction 1D antenna port array channel and the vertical direction 1D antenna port array channel. Initially, $\hat{h}_H[n]$ and $\hat{h}_V[n]$ may be defined as follows using $\hat{h}_{H,p}[n]$ and $\hat{h}_{V,p}[n]$ obtained in the above channel estimation process for the horizontal/vertical direction 1D antenna port array.

$$\hat{h}_H[n] = [\hat{h}_{H,1}[n] \hat{h}_{H,2}[n] \ldots \hat{h}_{H,M_H}[n]]$$

$$\hat{h}_V[n] = [\hat{h}_{V,1}[n] \hat{h}_{V,2}[n] \ldots \hat{h}_{V,M_V}[n]] \quad \text{[Equation 16]}$$

In this case, $\hat{h}_H[n]$ and $\hat{h}_V[n]$ have non-zero values only in L channel taps according to the above L significant channel tap configuration process, and ($1 \times M_H M_V$) channel vectors for the 2D antenna port array channel in each l-th channel tap may express the locations of the L channel taps using $\hat{h}_{H,l} = \hat{h}_H[\Psi_L(l)]$ and $\hat{h}_{V,l} = \hat{h}_V[\Psi_L(l)]$ according to the set $\Psi_L$. Here, $\Psi_L(l)$ denotes an l-th element of $\Psi_L$, and indicates the location of the l-th channel tap on the time axis. Then, the estimation values $\hat{h}_l$ of the channel vectors corresponding to the 2D antenna port array in the l-th channel tap may be expressed as a Kronecker product of $\hat{h}_{H,l}$ and $\hat{h}_{V,l}$.

$$\hat{h}_l = (\hat{h}_{H,p_{H,c}}[\Psi_L(l)]))^{-1} \hat{h}_{H,l} \otimes \hat{h}_{V,l} \text{ or } \hat{h}_l = (\hat{h}_{V,p_{V,c}}[\Psi_L(l)]))^{-1} \hat{h}_{H,l} \otimes \hat{h}_{V,l} \quad \text{[Equation 17]}$$

Here, $p_{H,c}$ and $p_{V,c}$ denote a common antenna port between the horizontal direction 1D antenna port array and the vertical direction 1D antenna port array. For example, if the 1st antenna port of the horizontal direction 1D antenna port array equals the 1st antenna port of the vertical direction 1D antenna port array, $p_{H,c} = 1$ and $p_{V,c} = 1$.

Estimation according to linear phase assumption

A specific embodiment of the present invention proposes a method for estimating a horizontal direction phase increment $\Delta_H$ and a vertical direction phase increment $\Delta_V$ in an l-th channel tap, and estimating a channel gain $\alpha$ to calculate channel vectors $\hat{h}_l$ for the 2D antenna port array, when CIR has been estimated for the horizontal direction 1D antenna port array channel and the vertical direction 1D antenna port array channel. The CIR has non-zero values only in L channel taps according to the above L significant channel tap configuration process, and $\Delta_H$ and $\Delta_V$ in each l-th channel tap are estimated as given by the following equation.

$$(\hat{\Delta}_H, \hat{\Delta}_V) = \operatorname*{argmin}_{0 \le \theta_H \le 2\pi, 0 \le \theta_V \le 2\pi} Err(\theta_H, \theta_V) \quad \text{[Equation 18]}$$

Here, $Err(\theta_H, \theta_V)$ denotes an error when $\Delta_H$ and $\Delta_V$ are assumed as $\theta_H$ and $\theta_V$, respectively, and it is also assumed that a channel in each l-th channel tap is expressible in the form of Equation 4, and may be defined as follows.

$$Err(\theta_H, \theta_V) = \left\{ \sum_{p=1}^{M_H} \left\| \hat{h}_{H,p}[\Psi_L(l)] - \alpha_l(\theta_H, \theta_V) e^{j(p-1)\theta_H} \right\|^2 + \sum_{q=1}^{M_V} \left\| \hat{h}_{H,q}[\Psi_L(l)] - \alpha_l(\theta_H, \theta_V) e^{j(q-1)\theta_V} \right\|^2 \right\} \quad \text{[Equation 19]}$$

where $$\alpha_l(\theta_H, \theta_V) = \frac{1}{M_H + M_V} \left( \sum_{p=1}^{M_H} e^{-j(p-1)\theta_H} \hat{h}_{H,p}[\Psi_L(l)] + \sum_{q=1}^{M_V} e^{-j(q-1)\theta_V} \hat{h}_{V,q}[\Psi_L(l)] \right)$$

Here, $\Psi_L(l)$ denotes an l-th element of $\Psi_L$, and indicates the location of the l-th channel tap on the time axis. If the estimation values $\hat{\Delta}_H$ and $\hat{\Delta}_V$ of $\Delta_H$ and $\Delta_V$ are given according to Equation 18 and Equation 19, the channel gain $\alpha$ may be estimated as $\alpha(\hat{\Delta}_H, \hat{\Delta}_V)$ which is a function included in Equation 19. Then, the ($1 \times M_H M_V$) channel vectors $\hat{h}_l$ for the 2D antenna port array channel in the l-th channel tap may be expressed as follows.

$$\hat{h}_l = \alpha(\hat{\Delta}_H, \hat{\Delta}_V) \cdot [1 e^{j\hat{\Delta}_V} e^{j2\hat{\Delta}_V} \ldots e^{j(M_V-1)\hat{\Delta}_V} e^{j\hat{\Delta}_H} e^{j(\hat{\Delta}_H+\hat{\Delta}_V)} \\ e^{j(\hat{\Delta}_H+2\hat{\Delta}_V)} \ldots e^{j(\hat{\Delta}_H+(M_V-1)\hat{\Delta}_V)} \ldots e^{j(M_H-1)\hat{\Delta}_H} \\ e^{j((M_H-1)\hat{\Delta}_H+\hat{\Delta}_V)} e^{j((M_H-1)\hat{\Delta}_H+2\hat{\Delta}_V)} \ldots \\ e^{j((M_H-1)\hat{\Delta}_H+(M_V-1)\hat{\Delta}_V)}] \quad \text{[Equation 20]}$$

Meanwhile, the ($1 \times M_H M_V$) channels $\hat{h}$ may be reproduced as follows based on $\hat{h}_l$ calculated in the above estimation process according to the Kronecker product operation per channel tap and the estimation process according to the linear phase assumption.

$$\hat{h} = \sum_{l=0}^{L-1} \hat{h}_l \cdot \delta(n - \tau_l) \text{ for } n = 0, 1, \ldots, N-1 \quad \text{[Equation 21]}$$

Here, $\tau_l$ denotes a location on the time axis where the l-th channel tap is present.

Method for association with CSI feedback

Fallback operation and feedback on fallback

A specific embodiment of the present invention proposes a method for assuming RI as a preliminarily fixed value (e.g., Rank 1) and performing wideband CSI feedback together with a fallback indication using a CSI-RS for fallback which is defined as described above, if the UE determines that approximation to a Kronecker product is not possible when estimation values for the 2D antenna port array channel are calculated using CIR values estimated for the horizontal direction 1D antenna port array channel and the vertical direction 1D antenna port array channel. The method for estimating channel information of a 2D antenna port array using channel information of 1D antenna port arrays, which is proposed by the present invention, is not easily applicable when a plurality of sub-paths are present even in one channel tap. That is, the above channel estimation process for the horizontal/vertical direction 1D antenna port array and the channel estimation process of the 2D antenna port array according to embodiments of the present invention are effective in an environment where a tap of each channel has a single path. Accordingly, the UE should be able to perform fallback operation just in case, and the current embodiment proposes a method for configuring a CSI-RS for fallback in a CSI process, signaling indication information indicating whether current feedback corresponds to fallback or not, in a CSI feedback process by the UE, and performing wideband CSI feedback on a rank value predefined with the BS in offline if current feedback is fallback CSI feedback, as a solution thereto. For example, the UE may determine whether current feedback corresponds to fallback, using a relative size of $\text{Err}(\hat{\Delta}_H, \hat{\Delta}_V)$ compared to the power sum for a total of $(M_H+M_V)$ antenna port channels. In this case, if the CSI-RS for fallback is not configured, the UE may perform CSI feedback on one of $\text{CSI-RS}_V$ and $\text{CSI-RS}_H$.

Method for channel tap based PMI feedback

Method for feeding back multiple PMIs for channel taps

A specific embodiment of the present invention proposes a method for selecting PMI based on a codebook per channel tap obtained in the above channel estimation process for the horizontal/vertical direction 1D antenna port array and the channel estimation process of the 2D antenna port array, and transmitting L PMIs for L channel taps, when the codebook has a linear phase increment property in the horizontal direction and the vertical direction and when estimation values for the 2D antenna port array channel are calculated using CIR values estimated for the horizontal direction 1D antenna port array channel and the vertical direction 1D antenna port array channel. In this case, the number of channel taps, i.e., L, may be predefined between the BS and the UE. In general, the codebook having a linear phase increment property can be relatively easily designed in the form of a DFT matrix. Thus, if a codebook for massive MIMO is designed based on a DFT matrix, the accuracy of the codebook is expected to be high at least in each channel tap. Accordingly, the present invention proposes a method for predefining the value of L with the BS, selecting L channel taps, and transmitting PMI per channel tap by the UE. In this case, the PMI may be transmitted to reproduce a channel per channel tap. That is, the BS may regard that a precoding matrix (PM) indicated by the PMI reported by the UE through CSI feedback is obtained by approximating a channel in a specific channel tap.

Method for feeding back relative size and phase difference between channel taps

A specific embodiment of the present invention proposes a method for feeding back relative sizes and phase differences of the L PMIs of the above process for feeding back multiple PMIs for channel taps when estimation values for the 2D antenna port array channel are calculated using CIR values estimated for the horizontal direction 1D antenna port array channel and the vertical direction 1D antenna port array channel. Although PMI information per channel tap is received in the above process for feeding back multiple PMIs for channel taps, since the size and relative phase of each channel tap can differ from those of another channel tap as shown in Equation 21, the BS should acquire information about a relative size and phase difference of PMIs. Accordingly, the present invention proposes a method for feeding back the information about a relative size and phase difference of PMIs by the UE. However, the above information is based on the properties of the channel taps and can be transmitted in a relatively long cycle. Accordingly, load of feedback is expected to be small.

Figure 10:
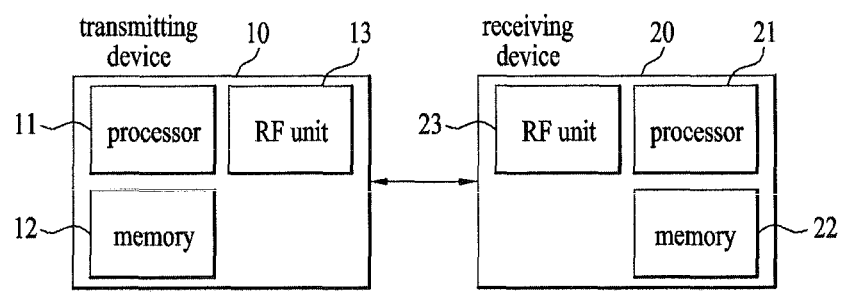
FIG. 10 is a block diagram of devices for implementing embodiment(s) of the present invention.

FIG. 10 is a block diagram of a transmitting device 10 and a receiving device 20 configured to implement exemplary embodiments of the present invention. Referring to FIG. 10, the transmitting device 10 and the receiving device 20 respectively include radio frequency (RF) units 13 and 23 for transmitting and receiving radio signals carrying information, data, signals, and/or messages, memories 12 and 22 for storing information related to communication in a wireless communication system, and processors 11 and 21 connected operationally to the RF units 13 and 23 and the memories 12 and 22 and configured to control the memories 12 and 22 and/or the RF units 13 and 23 so as to perform at least one of the above-described embodiments of the present invention.

The memories 12 and 22 may store programs for processing and control of the processors 11 and 21 and may temporarily storing input/output information. The memories 12 and 22 may be used as buffers. The processors 11 and 21 control the overall operation of various modules in the transmitting device 10 or the receiving device 20. The processors 11 and 21 may perform various control functions to implement the present invention. The processors 11 and 21 may be controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present invention is implemented using firmware or software, firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 is scheduled from the processor 11 or a scheduler connected to the processor 11 and codes and modulates signals and/or data to be transmitted to the outside. The coded and modulated signals and/or data are transmitted to the RF unit 13. For example, the processor 11 converts a data stream to be transmitted into K layers through demultiplexing, channel coding, scrambling and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include Nt (where Nt is a positive integer) transmit antennas.

A signal processing process of the receiving device 20 is the reverse of the signal processing process of the transmitting device 10. Under the control of the processor 21, the RF unit 23 of the receiving device 10 receives RF signals transmitted by the transmitting device 10. The RF unit 23 may include Nr receive antennas and frequency down-converts each signal received through receive antennas into a baseband signal. The RF unit 23 may include an oscillator for frequency down-conversion. The processor 21 decodes and demodulates the radio signals received through the receive antennas and restores data that the transmitting device 10 wishes to transmit.

The RF units 13 and 23 include one or more antennas. An antenna performs a function of transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. A signal transmitted through each antenna cannot be decomposed by the receiving device 20. A reference signal (RS) transmitted through an antenna defines the corresponding antenna viewed from the receiving device 20 and enables the receiving device 20 to perform channel estimation for the antenna, irrespective of whether a channel is a single RF channel from one physical antenna or a composite channel from a plurality of physical antenna elements including the antenna. That is, an antenna is defined such that a channel transmitting a symbol on the antenna may be derived from the channel transmitting another symbol on the same antenna. An RF unit supporting a MIMO function of transmitting and receiving data using a plurality of antennas may be connected to two or more antennas.

The transmitting device and/or the receiving device may be configured as a combination of one or more embodiments of the present invention.

The embodiments of the present application has been illustrated based on a wireless communication system, specifically 3GPP LTE (-A), however, the embodiments of the present application can be applied to any wireless communication system in which interferences exist.

According to an embodiment of the present invention, the accuracy of channel estimation may be improved, and a channel for a 2D array antenna may be calculated by operating Kronecker product of channels for individual horizontal and vertical 1D antenna arrays of the 2D array antenna.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for estimating a channel transmitted through a 2-dimensional (2D) array antenna in a wireless communication system, the method being performed by a user equipment (UE) and comprising:
  calculating channel estimation values for each of horizontal and vertical direction antenna arrays of the 2D array antenna in a channel state information-reference signal (CSI-RS) resource using a discrete Fourier transform (DFT) based channel estimation scheme, wherein the channel estimation values are expressed as one or more non-zero channel taps due to multipath fading;
  filtering channel taps having a delay value less than a maximum delay value from the channel estimation values for each of the horizontal and vertical direction antenna arrays;
  obtaining, at each reference point on time axis, a power sum of the filtered channel taps for all antenna arrays of the 2D array antenna;
  determining L significant power sums from among power sums obtained for all reference points, where L is an integer more than one;
  deriving channel vectors for each of the horizontal direction antenna arrays and channel vectors for each of the vertical direction antenna arrays for each channel tap corresponding to respective one of the L significant power sums using the L significant power sums;
  calculating channel vectors of the 2D array antenna by operating Kronecker product of the channel vectors for each of the horizontal direction antenna arrays and the channel vectors for each of the vertical direction antenna arrays for each channel tap corresponding to respective one of the L significant power sums; and
  transmitting CSI feedback based on the channel estimation values.

2. The method according to claim 1, further comprising receiving a CSI-RS configuration for each of the horizontal and vertical direction antenna arrays of the 2D array antenna.

3. The method according to claim 1, further comprising receiving a CSI-RS configuration for fallback to be used when the channel estimation is not available.

4. The method according to claim 3, further comprising reporting wideband CSI feedback for a fixed rank using the CSI-RS configuration for fallback when the channel estimation is not available.

5. The method according to claim 1, wherein the maximum delay value corresponds to a largest value among delay values of channels for all horizontal and vertical direction antenna arrays of the 2D array antenna.

6. The method according to claim 1, further comprising reporting a precoding matrix indicator (PMI) for each of the L significant power sums.

7. The method according to claim 6, further comprising reporting relative sizes and phase differences of the PMIs for the L significant power sums.

8. A user equipment (UE) for estimating a channel transmitted through a 2-dimensional (2D) array antenna in a wireless communication system, the UE comprising:
  a radio frequency (RF) unit; and
  a processor configured to control the RF unit,
  wherein the processor is further configured to:
  calculate channel estimation values for each of horizontal and vertical direction antenna arrays of the 2D array antenna in a channel state information-reference signal (CSI-RS) resource using a discrete Fourier transform (DFT) based channel estimation scheme, wherein the channel estimation values are expressed as one or more non-zero channel taps due to multipath fading;
  filter channel taps having a delay value less than a maximum delay value from the channel estimation values for each of the horizontal and vertical direction antenna arrays;
  obtain, at each reference point on time axis, a power sum of the filtered channel taps for all antenna arrays;
  determine L significant power sums from among power sums obtained for all reference points, where L is an integer more than one;
  derive channel vectors for each of the horizontal direction antenna arrays and channel vectors for each of the vertical direction antenna arrays for each channel tap corresponding to respective one of the L significant power sums using the L significant power sums;
  calculate channel vectors of the 2D array antenna by operating Kronecker product of the channel vectors for each of the horizontal direction antenna arrays and the channel vectors for each of the vertical direction antenna arrays for each channel tap corresponding to respective one of the L significant power sums; and
  transmit CS feedback based on the channel estimation values.

* * * * *